(No Model.)
J. BACON.
MECHANICAL MOVEMENT.
No. 532,999. Patented Jan. 22, 1895.
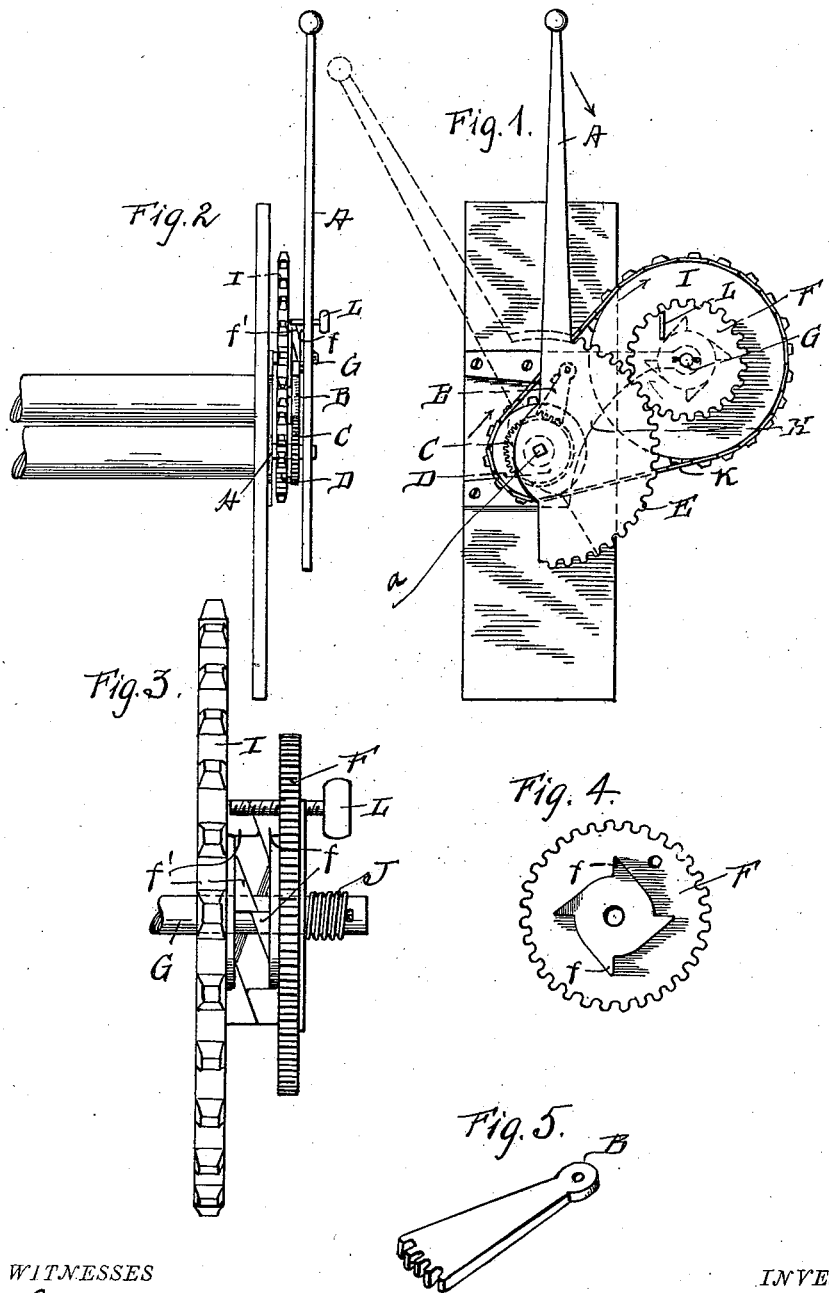
WITNESSES
Geo. M. Anderson
Philip C. Masi
INVENTOR
Jerome Bacon,
by E. W. Anderson
his Attorney

UNITED STATES PATENT OFFICE

JEROME BACON, OF HURON, SOUTH DAKOTA.

MECHANICAL MOVEMENT.

SPECIFICATION forming part of Letters Patent No. 532,999, dated January 22, 1895.

Application filed May 10, 1894. Serial No. 510,772. (No model.)

*To all whom it may concern:*

Be it known that I, JEROME BACON, a citizen of the United States, and a resident of Huron, in the county of Beadle and State of South Dakota, have invented certain new and useful Improvements in Mechanical Movements; and I do declare the following to be a full, clear, and exact description of the invention, such as will enable others skilled in the art to which it appertains to make and use the same, reference being had to the accompanying drawings, and to letters of reference marked thereon, which form a part of this specification.

Figure 1 of the drawings is a side elevation of the invention applied to a clothes wringer. Fig. 2 is a front view of same. Figs. 3 and 4 are details of the clutch. Fig. 5 is a detail of the reversible pawl.

This invention has relation to certain new and useful improvements in mechanical movements, the object being to provide a simple and efficient movement designed as a substitute for the crank in propelling various machines; and the invention consists in the novel construction and combination of parts, all as hereinafter described and pointed out in the appended claims.

In the accompanying drawings I have shown my invention applied to an ordinary clothes wringer, but it will be understood that it may be applied to various machines without any substantial change in the parts.

In the drawings the letter A designates a lever which is loosely fulcrumed near its lower end upon the shaft $a$ of the lower roller of the wringer. Pivoted to the inner face of this lever is a reversible pawl B having teeth upon its free end adapted to actively engage when in the position shown in Fig. 1 with the teeth of a toothed wheel or pinion C, fast on said shaft $a$, while the lever is moved through its up stroke, but to pass idly over said teeth during the reverse movement of the lever. Attached to the pinion C is a second wheel D, usually of somewhat larger diameter and provided with peripheral sprocket teeth. The two wheels C and D are usually integral with each other. The lower portion of the lever A is formed with a toothed segment E, the center of which is the fulcrum of said lever. The teeth of this segment mesh with the teeth of a pinion F which is loosely journaled upon an axis G, carried by a bracket H affixed to the frame of the wringer. On the inner face of this pinion are clutch teeth $f$ arranged to engage during the down stroke of the lever A with similar teeth $f'$ carried by a larger sprocket wheel I on the axis G. During the opposite stroke of said lever and the consequent opposite rotation of the pinion F, said clutch teeth do not effectually engage each other, and the wheel I is not affected by the movement of said pinion. A spring J coiled around the said axis holds the pinion F in position to engage the wheel I. Running from the said wheel I to the sprocket wheel D is a chain belt K. It will appear therefore that during the up stroke of the lever, the wringer rolls are driven by the pinion C, while during the down stroke they are driven by the pinion F and sprocket gear I, K, and D, the rotation of the wringer rolls being in the same direction through both strokes, but somewhat faster during the down stroke.

In order to reverse the motion of the wringer should it be necessary, the pinion F is provided with a set screw L therethrough, said screw projecting nearly or quite to the sprocket wheel I. By turning this thumb screw against the wheel I, the clutches are pressed apart, and the two wheels F and I are enabled to work in opposite directions. The pawl B is then reversed so as to oppositely engage the pinion C, and thus by the movement of the lever A, reverses the rotation of the wringer rolls.

It will be observed that, the fulcrum being at a low point in the bar A, a high leverage is obtained, and the application of this leverage to the gearing is at the lower portion of the pinion F, and in an upward direction.

Having thus described my invention, what I claim as new, and desire to secure by Letters Patent, is—

1. In a mechanical movement, the combination of a lever fulcrumed near one end, a pinion fast on the shaft to be driven, a pawl carried by said lever and arranged to engage the teeth of said pinion during one stroke of said lever, a toothed segment on said lever, a loose gear wheel meshing with said segment, a second wheel on the same shaft with said gear wheel, clutch devices for causing the driving engagement of the two wheels upon one stroke only of the lever, and a belt from said second wheel to a wheel on the driven shaft, substantially as specified.

2. In a mechanical movement, the combination of a lever fulcrumed near one end, a reversible pawl carried by said lever, a pinion on the shaft to be driven engaged by said pawl and driven thereby in one direction, a toothed segment on said lever, a loose pinion having its teeth engaged by said segment, a sprocket wheel on the same shaft with said pinion, clutch teeth on the adjacent faces of said pinion and sprocket wheel, said teeth being formed to actively engage each other during one stroke only of the lever, a spring for holding said clutch teeth in contact, means whereby said wheels may be held apart, and a sprocket chain running from said sprocket wheel to a wheel on the shaft to be driven, substantially as specified.

In testimony whereof I affix my signature in presence of two witnesses.

JEROME BACON.

Witnesses:
W. S. DARRARCE,
JOHN P. NELSON.